United States Patent
Wasman et al.

(10) Patent No.: US 10,837,153 B2
(45) Date of Patent: Nov. 17, 2020

(54) BIOINSPIRED MINERALIZATION FOR GEOTECHNICAL SUBSTRUCTURES

(71) Applicant: University of Florida Research Foundation, Inc., Gainesville, FL (US)

(72) Inventors: Scott Joseph Wasman, Gainesville, FL (US); Douglas Rodriguez, Gainesville, FL (US); Laurie A. Gower, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 16/346,828

(22) PCT Filed: Nov. 1, 2017

(86) PCT No.: PCT/US2017/059462
§ 371 (c)(1),
(2) Date: May 1, 2019

(87) PCT Pub. No.: WO2018/085340
PCT Pub. Date: May 11, 2018

(65) Prior Publication Data
US 2020/0063392 A1    Feb. 27, 2020

Related U.S. Application Data

(60) Provisional application No. 62/415,768, filed on Nov. 1, 2016.

(51) Int. Cl.
*E02D 3/12* (2006.01)
*C09K 17/48* (2006.01)
(Continued)

(52) U.S. Cl.
CPC ............ *E02D 3/12* (2013.01); *C04B 28/28* (2013.01); *C09K 17/48* (2013.01); *E02D 27/26* (2013.01);
(Continued)

(58) Field of Classification Search
CPC .......... E02D 3/12; C09K 17/00; C09K 17/40; C09K 17/42; C09K 17/48
(Continued)

(56) References Cited

U.S. PATENT DOCUMENTS 4,106,296 A    8/1978    Leonard, Jr. et al.
5,663,123 A    9/1997    Goodhue, Jr. et al.
(Continued)

FOREIGN PATENT DOCUMENTS

CN    1560192 A    5/2005
EP    2598603 A2    4/2011
(Continued)

OTHER PUBLICATIONS

International Search Report dated Jan. 25, 2018.
(Continued)

*Primary Examiner* — Frederick L Lagman
(74) *Attorney, Agent, or Firm* — Thomas Horstemeyer, LLP

(57) ABSTRACT

Various examples are provided for in situ growth of subsurface structures using bioinspired mineralization. In one example, among others, a method for growth of a subsurface structure includes introducing a first aqueous mineral salt reactant and a second aqueous mineral salt reactant comprising a polymeric additive into a soil substrate. The first and second aqueous mineral salt reactants can combine to form a polymer-induced liquid-precursor (PILP) phase that initiates in situ mineralization in the soil substrate. Solidifying the mineralization can form a subsurface structure in (Continued)

the soil substrate. Multiple applications of aqueous mineral salt reactants can be introduced to adjust the thickness of the mineralization or for layers of coatings.

20 Claims, 7 Drawing Sheets

(51) Int. Cl.
  *C04B 28/28* (2006.01)
  *E02D 27/26* (2006.01)
  *C04B 111/00* (2006.01)

(52) U.S. Cl.
  CPC .............. *C04B 2111/00146* (2013.01); *C04B 2111/00732* (2013.01)

(58) Field of Classification Search
  USPC .................................................. 405/263, 264
  See application file for complete search history.

(56) References Cited

U.S. PATENT DOCUMENTS

| | | | |
|---|---|---|---|
| 5,824,725 A | 10/1998 | Lahalih | |
| 6,536,995 B2 | 3/2003 | Taki et al. | |
| 7,455,854 B2 | 11/2008 | Gower et al. | |
| 7,544,496 B2 | 6/2009 | Gower et al. | |
| 9,150,775 B2* | 10/2015 | Ostvold | C09K 8/5045 |
| 9,499,719 B2* | 11/2016 | Cadix | C09K 8/508 |
| 2006/0204581 A1 | 9/2006 | Gower et al. | |
| 2010/0172700 A1* | 7/2010 | Ostvold | C09K 17/02 |
| | | | 405/263 |
| 2010/0196104 A1 | 8/2010 | Constantz et al. | |
| 2011/0103889 A1 | 5/2011 | Blakefield et al. | |
| 2012/0319042 A1 | 12/2012 | Hoag et al. | |
| 2013/0324443 A1* | 12/2013 | Wang | C04B 24/163 |
| | | | 507/121 |
| 2014/0041553 A1 | 2/2014 | Constantz et al. | |
| 2014/0169879 A1 | 6/2014 | Hanley et al. | |
| 2014/0363240 A1* | 12/2014 | Putman | C09K 17/12 |
| | | | 405/266 |
| 2015/0096464 A1 | 4/2015 | Chen et al. | |
| 2017/0183836 A1* | 6/2017 | Ahmed | C09K 17/06 |

FOREIGN PATENT DOCUMENTS

| | | | | |
|---|---|---|---|---|
| EP | 2770034 A1 | | 12/2011 | |
| EP | 2497809 A1 | * | 9/2012 | ........... C09D 175/14 |
| JP | 59122579 A | * | 7/1984 | |

OTHER PUBLICATIONS

URETEK. Online Information http://uretekusa.com/about-uretek/ (Oct. 2016).
Hayward Baker. Online Information http://www.haywardbaker.com/WhatWeDo/Techniques/Grouting/CompactionGrouting/default.aspx (Sep. 2016).
Olaniyan, O.S., Olaoye, R.A, Okeyinka, O.M, and Olaniyan, D.B: "Soil Stabilization Techniques Using Sodium Hydroxide Additives" (Dec. 2011).
Ali Ates: "The Effect of Polymer-Cement Stabilization on the Unconfined Compressive Strength of Liquefiable Soils" (May 2013).
AggreBind Soil Stabilizer at http://aggrebind.com/ (Oct. 2016).
Soil Stabilizer Enviroseal M10+50™ at http://www.enviroseal.com/m-10.htm (Oct. 2016).
Bionic Soil Solution at http://bionicsoilsolutions.com/ (Oct. 2016).
PolyPavement at http://www.polypavement.com/index.php (Oct. 2016).
"Global strategies and potential to curb CO2 emissions in cement industry" by Benhelal, E., Zahedi, G., Shamsaei, E., and Bahadori, A. Journal of Cleaner Production (Jul. 2013).
"Functional Remineralization of Dentin Lesions Using Polymer-Induced Liquid-Precursor Process" by Burwell, Anora. K., Taili Thula-Mata, Laurie B. Gower, Stefan Habeliz, Michael Kurylo, Sunita P. Ho, Yung-Ching Chien, Jing Cheng, Nancy F. Cheng, Stuart A. Gansky, Sally J. Marshall, and Grayson W. Marshall. PLoS One 7:6 (Jun. 2012): e38852.
"Biomimetic Model Systems for Investigating the Amorphous Precursor Pathway and Its Role in Biomineralization" by Gower, L. B. Chemical Reviews 108, No. 11 (Nov. 2008): 4551-627. http://dx.doi.org/doi: 10.1021/cr800443h.
"Deposition of Calcium Carbonate Films by a Polymer-Induced Liquid-Precursor (Pilp) Process" by Gower, Laurie B. and Damian .J. Odom. J. Crystal Growth 210:4 (Mar. 2000): 719-34.
"Bone Structure and Formation: A New Perspective" by Olszta, Matthew J., Xingguo Cheng, Sang Soo Jee, Rajendra Kumar, Yi-Yeoun Kim, Michael J. Kaufman, Elliot P. Douglas, and Laurie B. Gower. Materials Science & Engineering R-Reports 58, No. 3-5 (Nov. 2007): 77-116. http://dx.doi.org/10.1016/j.mser.2007.05.001.
"Lime stabilization of clay minerals and soils" by F.G. Bell. Engineering Geology (Jul. 1996).
"Microbially induced cementation to control sand response to undrained shear" by DeJong, J., Fritzges, M., and Nesslein, K. Journal of Geotechnical and Geoenvironmental Engineering, 132(11),1381-1392. (Nov. 2006).
"Enzyme induced carbonate precipitation (EICP) columns for ground improvement" by Kavazanjian, E., Jr. and Hamdan, N. Geotechnical Special Publication, ASCE. (Mar. 2015).
"Soil engineering in vivo; harnessing natural biogeochemical systems for sustainable, multi-functional engineering solutions" by DeJong, J. T., Soga, K., Banwart, S. A., Whalley, R., Ginn, T. R., Nelson, D. C., Mortensen, B. M., Martinez, B. C., and Barkouki, T. J. R. Soc. Interface (May 2010).

* cited by examiner

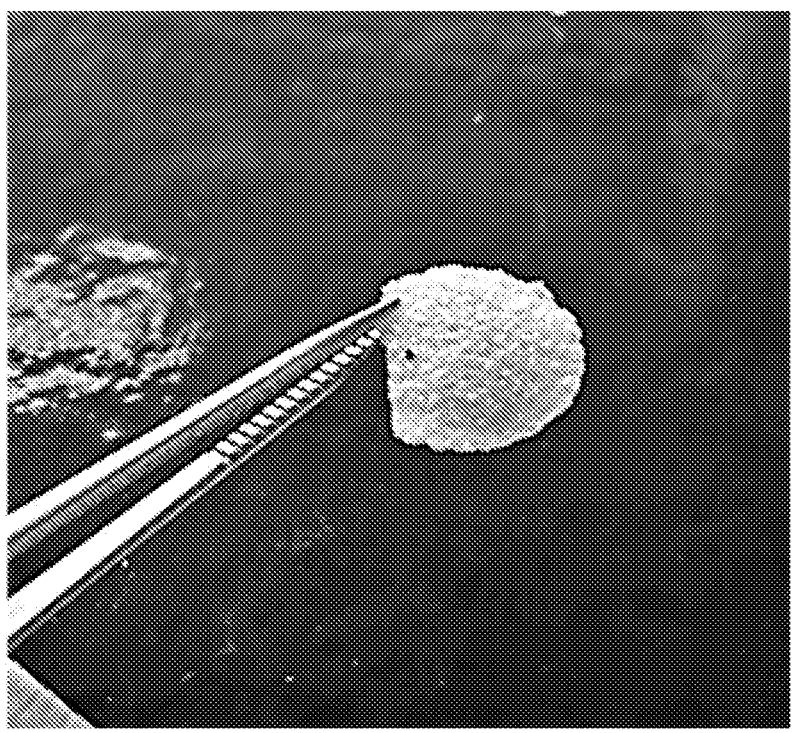
FIG. 5A
FIG. 5B
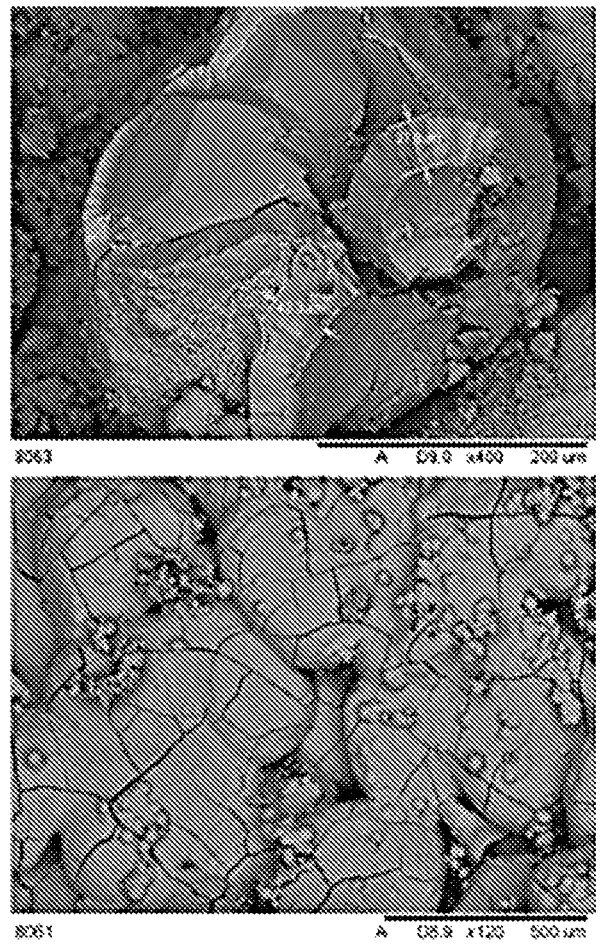
FIG. 5C

BIOINSPIRED MINERALIZATION FOR GEOTECHNICAL SUBSTRUCTURES

CROSS REFERENCE TO RELATED APPLICATIONS

This application is the 35 U.S.C. § 371 national stage application of PCT Application No. PCT/US2017/059462, filed Nov. 1, 2017, which claims priority to, and the benefit of, U.S. provisional application entitled "Bioinspired Mineralization for Geotechnical Substructures" having Ser. No. 62/415,768, filed Nov. 1, 2016, both of which are hereby incorporated by reference in their entireties.

BACKGROUND

Human's use of cement is ubiquitous. It is a primary constituent in nearly all anthropogenic construction with significant increases in its production due in large part to the expanding economies in Southeast Asia and Africa. Cement is a key component in concrete structural elements, in both the substructure (foundation, retaining wall, etc.) and super structure (building, bridge, etc.), providing cover to the load carrying reinforcement (rebar), a structural role providing compressive strength, frictional resistance with surrounding soil, and an inertial resistance to movement by external forces (e.g., wind, earthquakes, waves, etc.). The cause of global warming is the increased amount of carbon dioxide ($CO_2$) in earth's atmosphere. A byproduct of the cement production process is $CO_2$ release, leading to approximately 5-7% of the global $CO_2$ emissions.

SUMMARY

Aspects of the present disclosure are related to mineralization for geotechnical substructures. This allows in situ growth of subsurface structures using polymer induced mineralization.

In one aspect, among others, a method for growth of a subsurface structure comprises introducing a first aqueous mineral salt reactant into a soil substrate; introducing a second aqueous mineral salt reactant comprising a polymeric additive into the soil substrate, where the first and second aqueous mineral salt reactants combine to form a polymer-induced liquid-precursor (PILP) phase that initiates in situ mineralization in the soil substrate; and solidifying the mineralization to form the subsurface structure in the soil substrate. In one or more aspects, the polymeric additive can be acrylic acid. The first aqueous mineral salt reactant can comprise sodium carbonate ($Na_2CO_3$) and the second aqueous mineral salt reactant can comprise calcium chloride ($CaCl_2$). The mineralization can comprise calcium carbonate ($CaCO_3$) coating particles of the soil substrate.

In various aspects, the soil substrate can comprise sand, silt, clay, or a combination thereof. The mineralization can infiltrate void spaces between the particles of the soil substrate during the PILP phase. The mineralization can solidify into an agglomerated hardened material that cements the particles into the subsurface structure. The subsurface structure can comprise a root system formed by infiltration of the mineralization in the soil substrate. In some aspects, the first aqueous mineral salt reactant can be injected into the soil substrate through a first pipe in the soil substrate and the second first aqueous mineral salt reactant can be injected into the soil substrate through a second pipe in the soil substrate. The first and second pipes can be retracted from the soil substrate as the first and second aqueous mineral salt reactants are injected. A rate of injection of the first or second aqueous mineral salt reactant is varied during retraction of the first and second pipes.

In one or more aspects, the first and second pipes can be reinserted into the soil substrate after injection of the first and second aqueous mineral salt reactants. The method can further comprise injecting another application of the first and second aqueous mineral salt reactants to the soil substrate through the reinserted first and second pipes. The method can further comprise injecting a third aqueous mineral salt reactant and a fourth aqueous mineral salt reactant to the soil substrate through the reinserted first and second pipes. In various aspects, the method can further comprise introducing an additional application of the first aqueous mineral salt reactant into the soil substrate; introducing an additional application of the second aqueous mineral salt reactant comprising the polymeric additive into the soil substrate; and forming a coating over the mineralization of the subsurface structure in the soil substrate by solidifying in situ mineralization formed by a PILP phase produced by the additional application of the first and second aqueous mineral salt reactants.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 5A-5C are images illustrating the coating formed on sand by mineralization, in accordance with various embodiments of the present disclosure.

DETAILED DESCRIPTION

Figure 1:
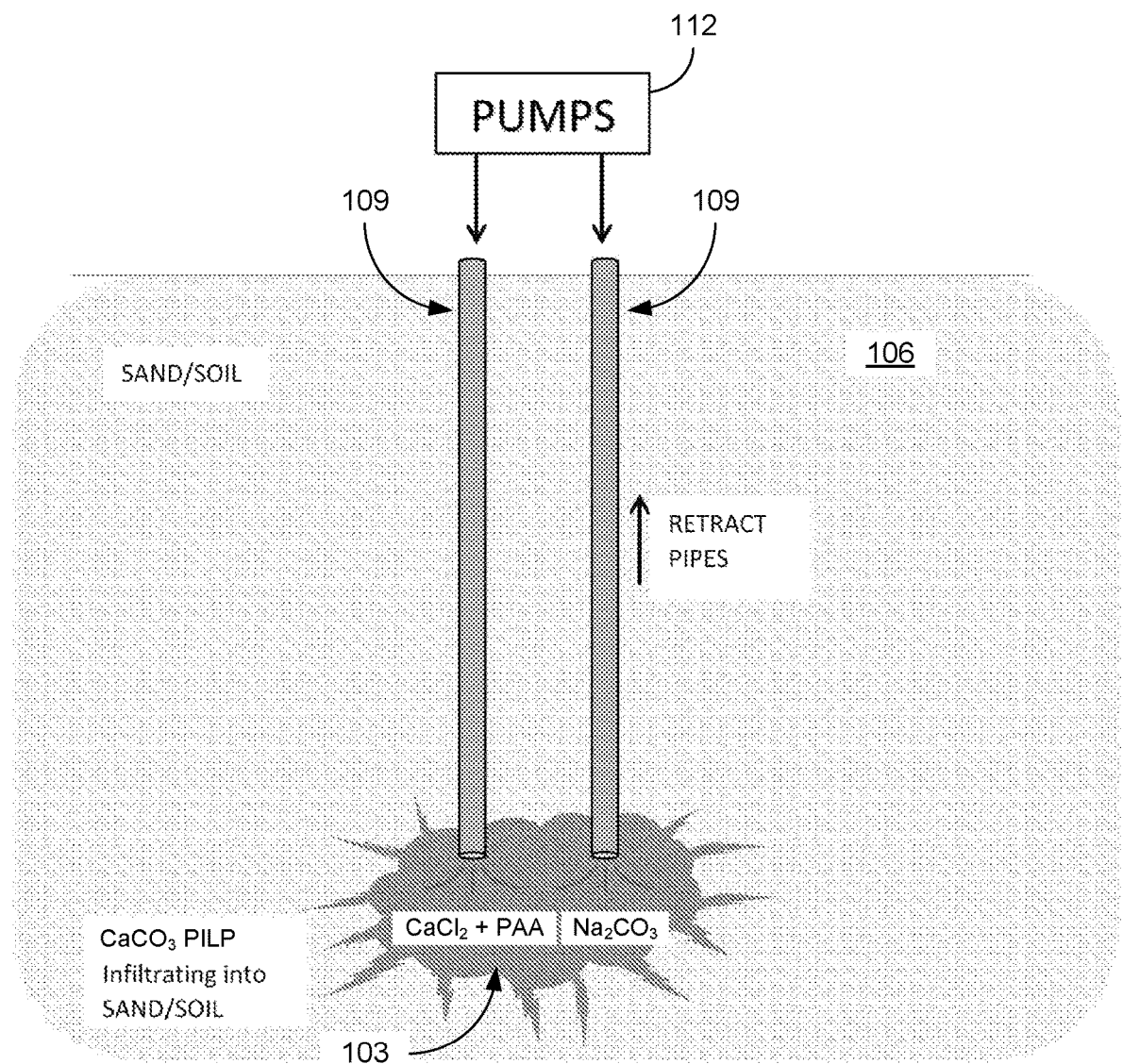
FIG. 1 is a graphical representation illustrating an example of subsurface delivery of reactants into the soil substrate, in accordance with various embodiments of the present disclosure.

Disclosed herein are various embodiments related to in situ growth of subsurface structures using polymer induced mineralization. Reference will now be made in detail to the description of the embodiments as illustrated in the drawings, wherein like reference numbers indicate like parts throughout the several views.

Cement is also the most common soil reinforcement material in use today with approximately 40,000 improvement projects annually in the United States. Most commonly, cement grout is pumped into the subsurface to improve the stiffness of soft soil. In other cases, it is introduced into the subsurface to control ground water flow and fill voids created by cavity formations in rock. For example, compaction grouting by Hayward Baker is the process of targeted injection of viscous grout to densify loose soil, reinforce soil, and stabilize subsurface voids.

Alternatives to using cement in the subsurface as a soil improvement technique have been researched over the past 30 years. For example, polymer resin has been injected into the subsurface as remediation to excessive building and roadway settlements. Research has led to another technique that utilizes precipitation of calcite mineral through microbial activity. Microbial induced calcite precipitation (MICP) utilizes enhanced numbers of native microbes fed a solution of nutrients to induce production of urea that leads to calcite formation on the surface of the soil grains. With sufficient nutrients, the process continues until the microbe cannot pass through the soil void spaces and ultimately calcifies itself in place and ceases to live. The biomineralization process leads to an increased stiffness of the soil matrix, however, it does not increase the bulk volume, which may induce undesirable stress changes in the surrounding soil matrix. However, MICP utilizes live organisms, which require nutrients be supplied to the microbes, is sensitive to pH, and is inhibited by organics.

Polymer induced mineralization offers advantages over MICP. Polymers can be used that mimic the role of proteins in directing biomineral formation, so that live organisms are not required (along with the nutrients and transport issues that limit this bioprocess). In the fully synthetic "biomimetic" system, the size and quantity of the mineral can be regulated by processing additives, to deliver a polymer-induced liquid-precursor (PILP) phase, which leads to non-equilibrium crystal morphologies that emulate biomineral features, which can lie at the foundation of calcium-based biomineralization processes.

As an alternative to the use of cement in building foundations, and contributing to a decrease in the amount of $CO_2$ introduced to the atmosphere, a methodology to grow building foundations is disclosed. Foundation elements are installed in the earth's subsurface by dynamic impact driving, screwing, and by construction in place at the site of a shallow or deep excavation. All structures (e.g., buildings, bridges, facilities, etc.) are supported by foundations, which in turn carry the loads applied to the structures and the load due to the structure's own self-weight. To accomplish similar, the inventors were inspired by how foundations and the root of a tooth are very similar in functionality.

Human teeth grow to have a crown and root from a condensed volume of cells (dental papilla) located in the gums of the jaw. The root carries the loads applied to the crown. The similarity between the two systems is the role each plays in supporting the structure when experiencing applied loads and the type of mechanical analysis performed to understand behavior. The building foundation system is designed, whereas the root grows, and has evolved to its present day function over millions of years. There are however design scenarios for artificial teeth roots. For example, in the modification or replacement of teeth roots, design is needed in the form of material selection (i.e., dental resin) or implant selection (i.e., endosteal implants).

Subsurface Delivery

For the in situ growth of subsurface structures such as, e.g., full scale (meter scale) foundation elements in a soil substrate, materials can be introduced in a targeted fashion into the subsurface of the earth (e.g., within 45 meters of the surface) to fortify natural geologic deposits of sand, silt, and/or clay. Aqueous mineral salt reactants comprising a polymeric additive can be combined in the soil substrate to initiate in situ mineralization, which can solidify into subsurface structures that can be used as, e.g., foundation elements.

FIG. 1 is a graphical representation illustrating an example of the introduction of aqueous mineral salt reactants 103 into a soil substrate 106 to form a subsurface structure. As shown in FIG. 1, two pipes 109 can be inserted into the soil substrate 106 to an initial depth. The pipes 109 can be placed into an existing borehole or inserted into the soil substrate 106 using, e.g., direct push techniques. For example, similar to techniques for subsurface chemical grouting, two sleeve port pipes can be introduced into the subsurface, spaced apart from each other by a separation distance (e.g., 1-2 meters), and at an initial depth. The separation distance between the pipes 109 may be based upon characteristics of the aqueous mineral salt reactants 103 and the soil subsurface 106. For instance, the separation distance can be determined based upon the ability of the aqueous mineral salt reactants 103 to flow through the soil.

The two pipes 109 can be used to introduce two separate counter ions for delayed reaction. As illustrated in FIG. 1, the aqueous mineral salt reactants 103 can be injected through the pipes 109 using pumps 112, which can be controlled to adjust the injection rate of the aqueous mineral salt reactants 103 into the soil substrate 106. As the aqueous mineral salt reactants 103 infiltrate the soil, they can combine to form a polymer-induced liquid-precursor (PILP) phase that initiates in situ mineralization in the soil substrate 106. The pipes 109 can be slowly retracted from the soil substrate 106 at a rate that allows the mineralization to proceed from the bottom up to avoid pipe clogging. The pipes 109 may be retracted at the same or different rates, and/or at the same depth or different depths. In some implementations, multiple applications of the process can be provided through the pipes 109.

Other methods may also be used to introduce the aqueous mineral salt reactants 103 to the soil substrate 106. For example, material can be implanted through excavation and burial, or direct push techniques can be used. Surfactants may be added to the aqueous mineral salt reactants 103 to enhance transport of fluids throughout the soil substrate 106 by altering the interfacial energy between the particles and infiltrating precursor phase. Surface active agents might also be used to modify the surfaces on the grains to enhance the adhesiveness of the mineral coating.

In Situ Mineralization Process

Figure 2A:
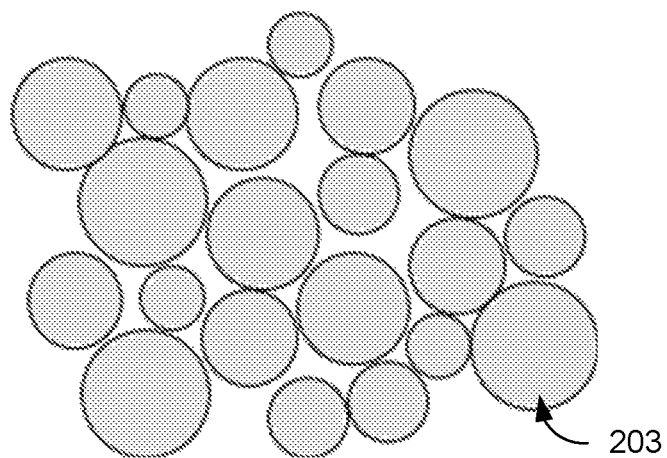
FIGS. 2A and 2B illustrate soil particles before and after mineralization infiltration, in accordance with various embodiments of the present disclosure.
Figure 2B:
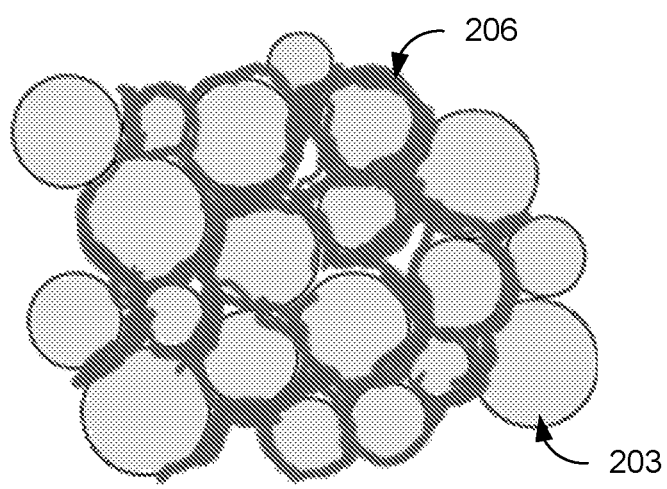

The process facilitates the introduction of aqueous mineral salt reactants 103 into the soil substrate 106 (e.g., a sand bed), which over time react to form the PILP phase, and result in infiltration of a PILP mineral precursor throughout the soil substrate 106. FIG. 2A illustrates the soil particles 203 before introduction of the aqueous mineral salt reactants 103, and FIG. 2B illustrates mineralization infiltration of the PILP phase. Upon solidification of the mineralization 206 (with release of water), an agglomerated hardened material is yielded. The aqueous solution reaction in a sand bed can be expressed as:

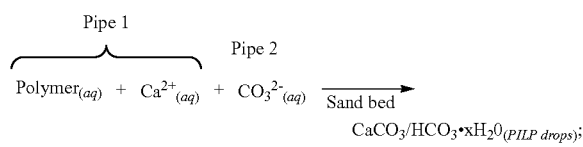

followed by precursor infiltration and mineralization (e.g., $CaCO_3$ formation) in the sand bed:

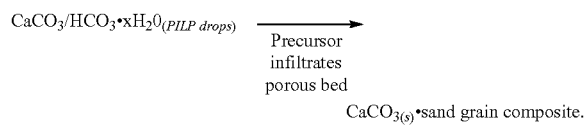

In the two pipe subsurface delivery process illustrated in FIG. 1, one pipe 109 can deliver an aqueous mineral salt reactant 103 comprising sodium carbonate and while the other pipe 109 can deliver an aqueous mineral salt reactant 103 comprising calcium chloride and a polymeric (PILP inducing) additive such as, e.g., polyacrylic acid. The PILP process is relatively non-specific, such that a variety of polyelectrolytes and charged polymers can be used to sequester the ions. This can include polycationic (amine based) as well as polyanionic polymers (containing carboxylates, sulfates, sulfonates, phosphates, phosphonates, etc.). Common amine based polymers could be synthetic, such as polyethyleneimine, or biopolymer based, such as peptides with high levels of lysine, arginine, and histidine. Anionic peptides or proteins might include high levels of aspartic and glutamic acid, as well as phosphorylate serine or threonine. The polynucleic acids, DNA and RNA, also have a high charge density from the phosphate backbone, and can elicit the PILP process. Many polysaccharides also have high charge density (carboxylates and sulfates) that might elicit the PILP process. The delivery rates of the aqueous mineral salt reactants 103 are dependent upon pressures and retraction rates of the pipes 109.

Figure 3:
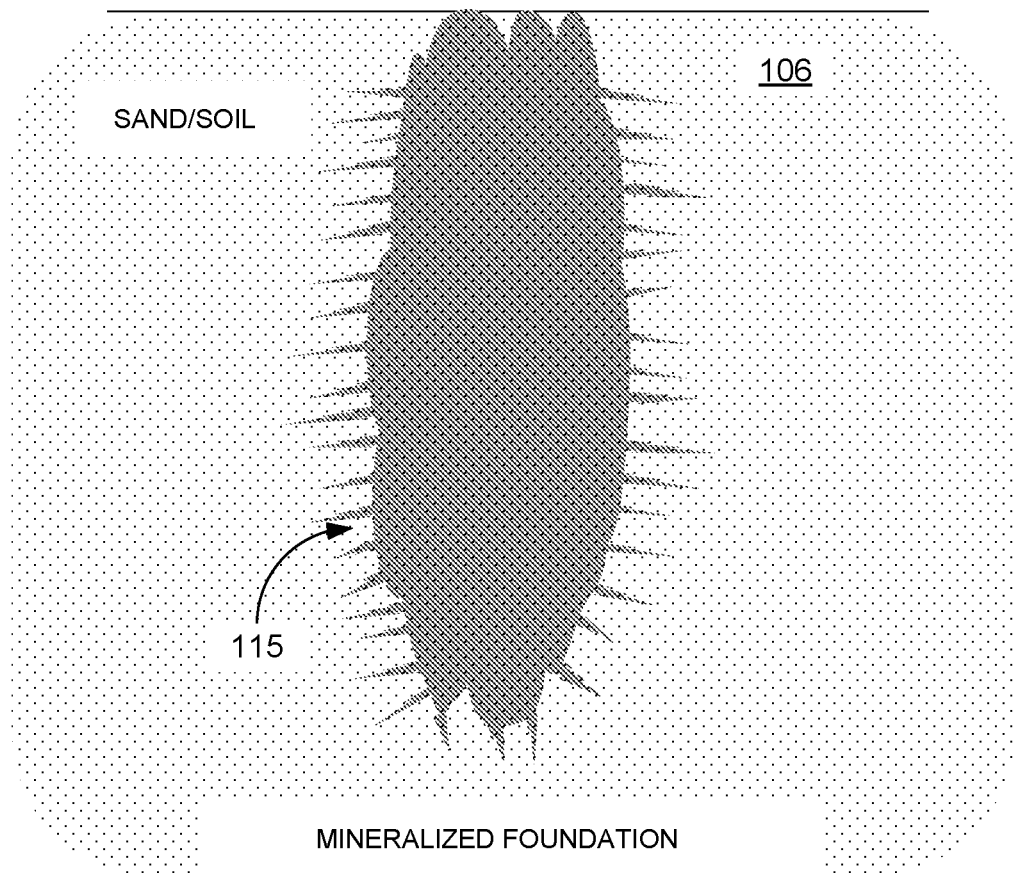
FIG. 3 is a graphical representation illustrating an example of a mineralized subsurface structure (e.g., a foundation) grown in the soil substrate, in accordance with various embodiments of the present disclosure.

When the reactants 103 combine, they form the mineral precursor (PILP) phase, which further infiltrates throughout the void space of the soil substrate 106 (e.g., sand bed) via capillarity (or capillary action), coating the granules or particles throughout the infiltration and bridging them into agglomerates as illustrated in FIG. 2B, which upon solidification cements the soil into a subsurface structure. An example of a solidified subsurface structure 115 is shown in FIG. 3. It is possible for the infiltration to lead to branching of the mineralization creating a mechanical interlocking "root" system, thereby improving the frictional resistance to external load over the traditional foundation with a planar interface. The growth process may be dependent on the soil chemistry and testing may be needed to determine the processing parameters (e.g., pressure, reaction parameters, etc.).

Experimental Testing

Figures 4A, 4B, 4C, 4D:
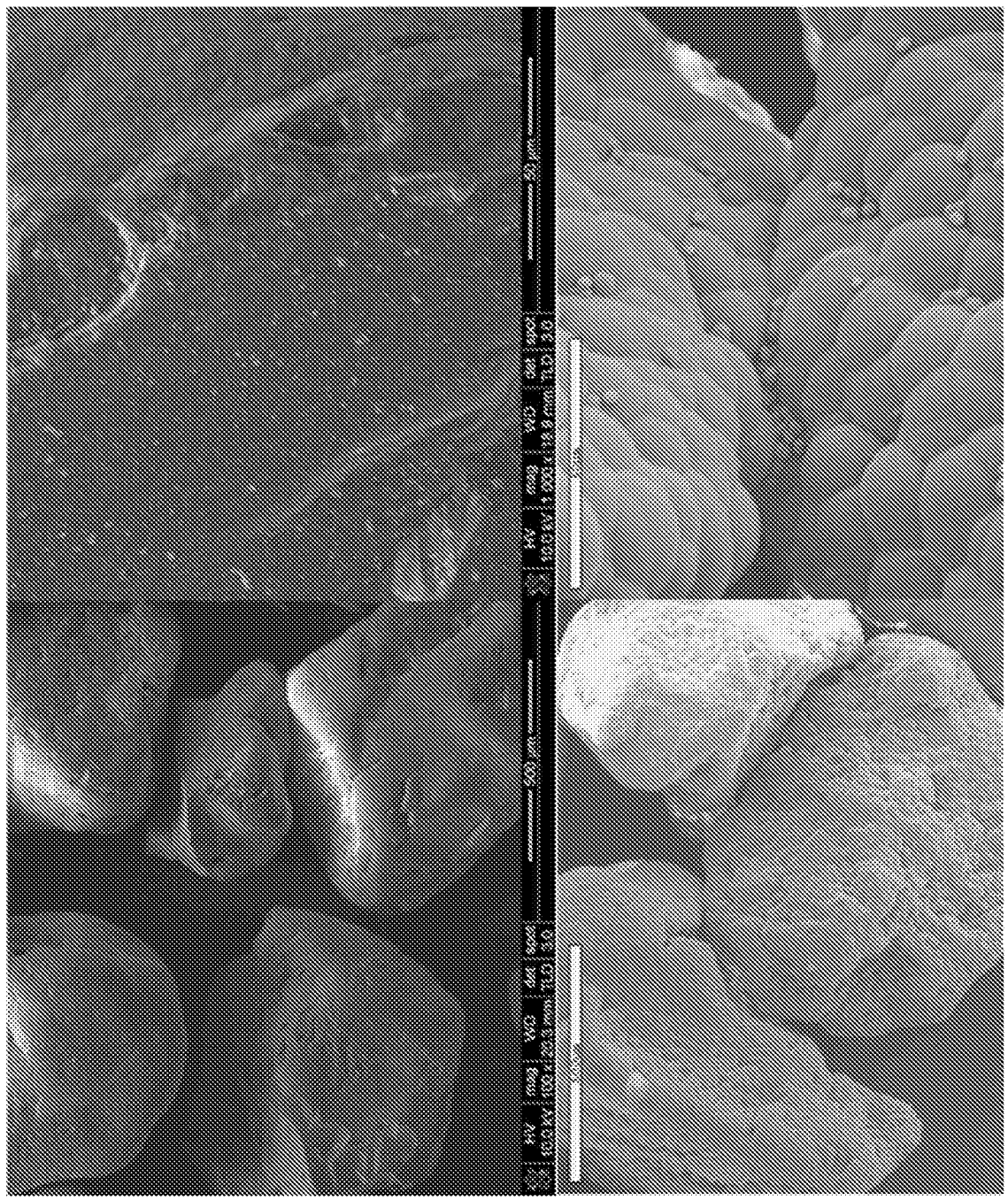
FIGS. 4A-4D are scanning electron microscope (SEM) images of silica sand grains before and after mineralization, in accordance with various embodiments of the present disclosure.

Laboratory tests were executed using a PILP phase of either calcium carbonate or calcium phosphate, each grown on fine silica sand (a naturally occurring mineral) in the laboratory. FIGS. 4A and 4B are magnified images of the silica sand grains. The focus area in FIG. 4B shows the surface of one of the silica sand grains at higher magnification. Through optimization of concentrations of the sodium carbonate in the first reactant 103 and calcium chloride and polymeric additive of acrylic acid (e.g., poly acrylic acid (PAA) from Sigma-Aldrich) in the second reactant 103, growth of calcium carbonate and calcium phosphate coatings on the silica sand and mineralization was observed. The images of FIGS. 4C and 4D show the $CaCO_3$ coated silica sand grains. It is evident that the mineralization cemented isolated sand grains together via mineral bridges into cohesive aggregates as seen in FIGS. 4C and 4D. The focus area in FIG. 4D shows two silica sand grains cemented together by overgrowth of spherulitic $CaCO_3$ coatings at higher magnification.

Thickness of the formed coating can vary based on the concentration and/or composition of the aqueous mineral salt reactants (e.g., sodium carbonate, calcium chloride and/or polymeric additive). For example, coatings with thicknesses in the range from about 10 μm to about 45 μm can be formed. Multiple applications of the process can lead to increased coating thickness thereby increased cementation among sand grains. For example, coatings with thicknesses in the range from about 20 μm to about 50 μm can be formed with at least two applications. The same or different combinations of aqueous mineral salt reactants can be utilized for each application. Through optimization of previous stated concentrations and applications leading to thicker coatings, hard objects with 1 cm width and 2-3 mm in thickness are formed as seen in FIGS. 5A, 5B, and 5C. FIG. 5A is an image showing a coating binding sand grains formed using 50 mM of sodium carbonate, 20 mM of calcium chloride and 1800 μg/ml PAA additive. FIGS. 5B and 5C are SEM images illustrating the thickness of the coating formed on the grains of sand and the coating surface binding the sand.

Figure 6:
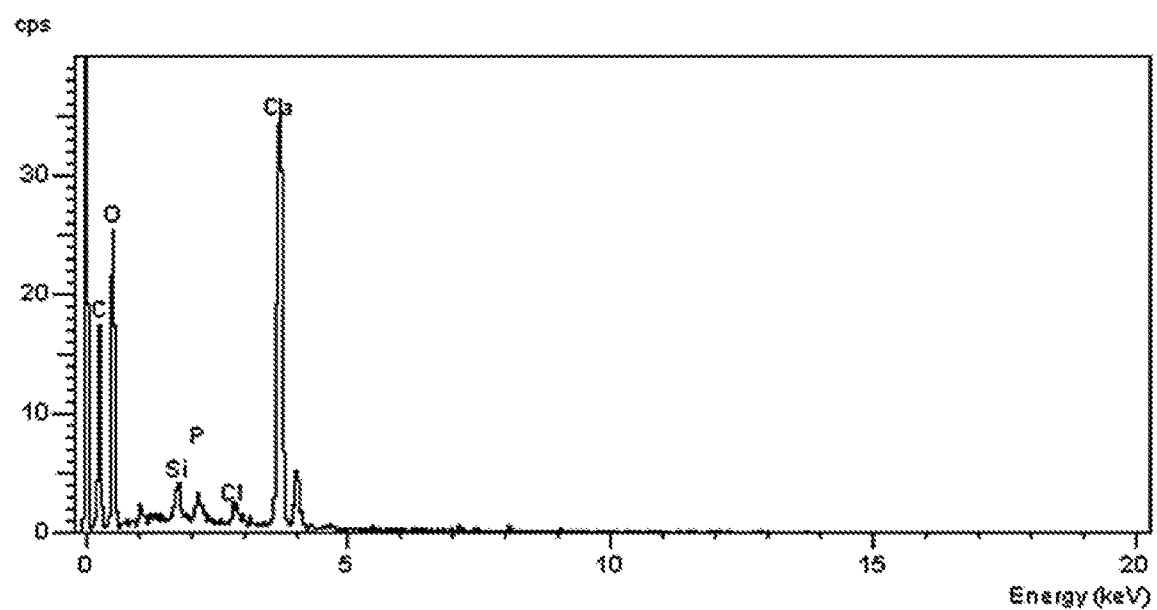
FIG. 6 illustrates an electron dispersive spectroscopy (EDS) analysis of the mineralization of FIGS. 4C and 4D, in accordance with various embodiments of the present disclosure.
Figure 7:
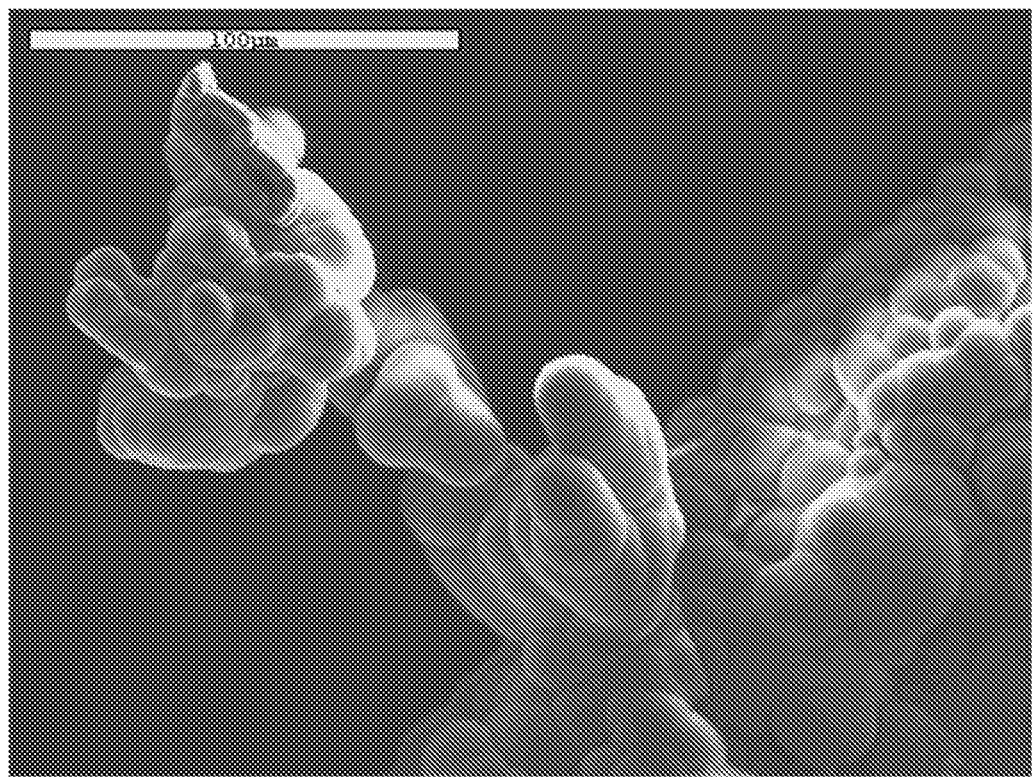
FIGS. 7-9 are images illustrating examples of the mineralization on silica sand grains, in accordance with various embodiments of the present disclosure.
Figure 8:
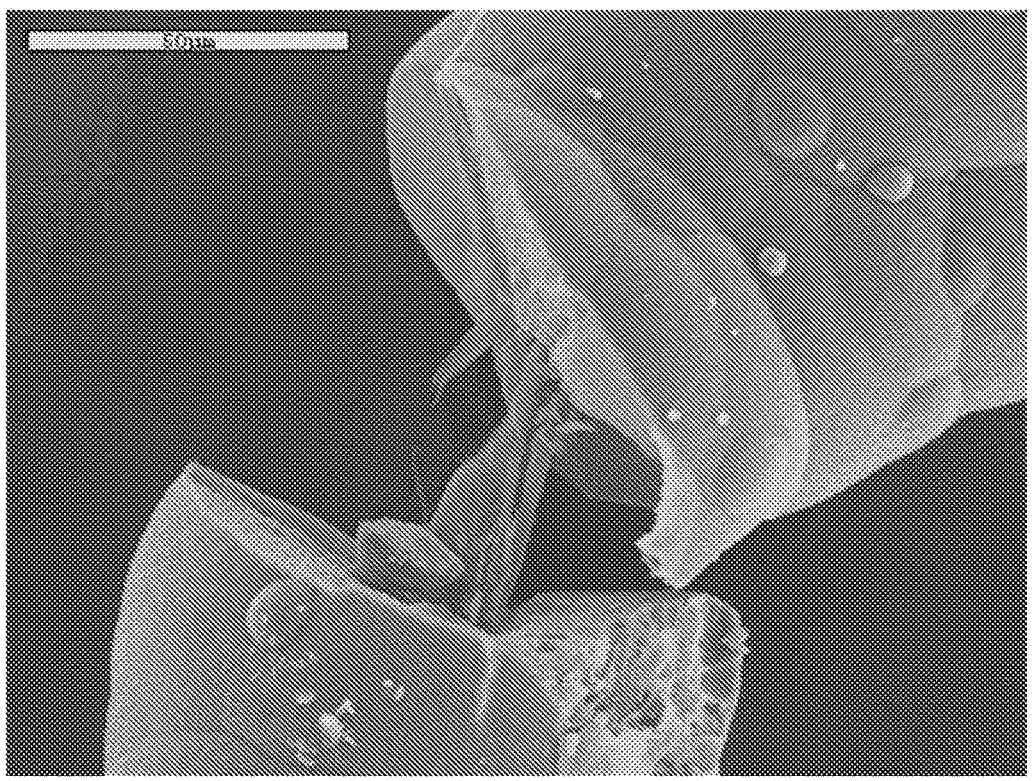
Figure 9:
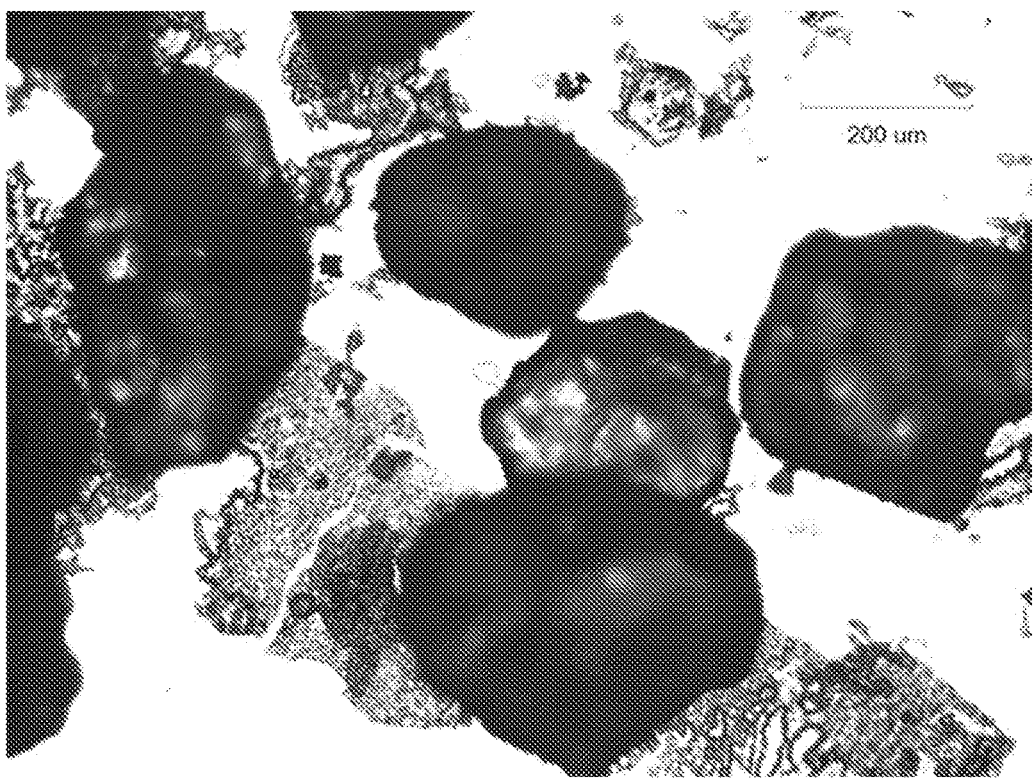

The observations were made using microscopy (optical and Scanning Electron) and the mineralization was confirmed using electron dispersive spectroscopy (EDS). FIG. 6 illustrates the results of the EDS analysis showing Ca as the predominant element in the coating. Additionally, growth of the calcium carbonate in other fashions was observed. Shown in FIG. 7 is calcium carbonate ($CaCO_3$) which had grown on itself into a protruded structure (or protrusion) from the surface of calcium carbonate coated silica sand particle. Such protrusions can branch out to other grains and accelerate the agglomeration process. Another form of the growth was observed to have occurred around a random fiber present in a dish during lab tests. FIG. 8 is an image of the growth of $CaCO_3$ around the fiber. This demonstrates the non-specificity of the process for coating various structures that may be in the soil substrate 106, thereby avoiding things that might otherwise block growth and interconnectivity of the mineral PILP phase. FIG. 9 is an optical micrograph showing accumulation of $CaCO_3$ on the sand grains as well as the glass substrate. As shown, the sand grains have been glued with strands of mineral coating to the glass slide substrate underneath the grains.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about y".

Therefore, at least the following is claimed:

1. A method for growth of a subsurface structure, comprising:
   introducing a first aqueous mineral salt reactant into a soil substrate, the first aqueous mineral salt reactant comprising a first mineral salt reactant;
   separately introducing a second aqueous mineral salt reactant into the soil substrate, the second aqueous mineral salt reactant comprising a second mineral salt reactant and a polymeric additive that sequesters ions, where the first and second aqueous mineral salt reactants combine in the soil substrate to form a polymer-induced liquid-precursor (PILP) phase that infiltrates void spaces between particles in the soil substrate by capillarity action and initiates in situ mineralization as the PILP phase coats the particles in the soil substrate; and
   where solidification of the mineralized PILP phase cements the particles together to form the subsurface structure in the soil substrate.

2. The method of claim 1, wherein the polymeric additive is acrylic acid or a charged polyelectrolyte that sequesters ions into the PILP phase.

3. The method of claim 1, wherein the first mineral salt reactant comprises sodium carbonate ($Na_2CO_3$) and the second mineral salt reactant comprises calcium chloride ($CaCl_2$)).

4. The method of claim 3, wherein the mineralized PILP phase comprises calcium carbonate ($CaCO_3$) coating the particles of the soil substrate.

5. The method of claim 4, wherein the soil substrate comprises sand, silt, clay, or a combination thereof.

6. The method of claim 4, wherein the PILP phase infiltrates the void spaces between the particles of the soil substrate during transformation of the PILP phase to the mineralized PILP phase.

7. The method of claim 6, wherein the mineralized PILP phase solidifies into an agglomerated hardened material that cements the particles of the soil substrate into the subsurface structure.

8. The method of claim 6, wherein the subsurface structure comprises an intercalated root system formed by infiltration of the mineralized PILP phase in the soil substrate.

9. A method for growth of a subsurface structure, comprising:
   introducing a first aqueous mineral salt reactant into a soil substrate, where the first aqueous mineral salt reactant is injected into the soil substrate through a first pipe in the soil substrate;
   introducing a second aqueous mineral salt reactant comprising a polymeric additive into the soil substrate, where the second aqueous mineral salt reactant is injected into the soil substrate through a second pipe in the soil substrate and the first and second aqueous mineral salt reactants combine to form a polymer-induced liquid-precursor (PILP) phase that initiates in situ mineralization in the soil substrate; and
   solidifying the mineralized PILP phase to form the subsurface structure in the soil substrate.

10. The method of claim 9, wherein the first and second pipes are retracted from the soil substrate as the first and second aqueous mineral salt reactants are injected.

11. The method of claim 10, wherein a rate of injection of the first or second aqueous mineral salt reactant is varied during retraction of the first and second pipes.

12. The method of claim 10, where the first and second pipes are reinserted into the soil substrate after injection of the first and second aqueous mineral salt reactants.

13. The method of claim 12, further comprising injecting another application of the first and second aqueous mineral salt reactants to the soil substrate through the reinserted first and second pipes.

14. The method of claim 12, further comprising injecting a third aqueous mineral salt reactant and a fourth aqueous mineral salt reactant to the soil substrate through the reinserted first and second pipes.

15. The method of claim 9, wherein the first aqueous mineral salt reactant comprises sodium carbonate ($Na_2CO_3$) and the second aqueous mineral salt reactant comprises calcium chloride ($CaCl_2$)).

16. A method for growth of a subsurface structure, comprising:
   introducing a first aqueous mineral salt reactant into a soil substrate;
   introducing a second aqueous mineral salt reactant comprising a polymeric additive into the soil substrate, where the first and second aqueous mineral salt reactants combine to form a polymer-induced liquid-precursor (PILP) phase that initiates in situ mineralization in the soil substrate;
   solidifying the mineralized PILP phase to form the subsurface structure in the soil substrate;
   introducing an additional application of the first aqueous mineral salt reactant into the soil substrate;
   introducing an additional application of the second aqueous mineral salt reactant comprising the polymeric additive into the soil substrate; and
   forming a coating over the mineralization of the subsurface structure in the soil substrate by solidifying in situ mineralization of an additional PILP phase produced by the additional application of the first and second aqueous mineral salt reactants.

17. The method of claim 16, wherein the first aqueous mineral salt reactant is injected into the soil substrate through a first pipe in the soil substrate and the second first aqueous mineral salt reactant is injected into the soil substrate through a second pipe in the soil substrate.

18. The method of claim 16, wherein the first aqueous mineral salt reactant comprises sodium carbonate ($Na_2CO_3$) and the second aqueous mineral salt reactant comprises calcium chloride ($CaCl_2$)).

19. The method of claim 16, wherein the mineralized PILP phase infiltrates void spaces between particles of the soil substrate during transformation of the PILP phase to the mineralized PILP phase.

20. The method of claim 18, wherein the mineralized PILP phase solidifies into an agglomerated hardened material that cements the particles of the soil substrate into the subsurface structure.

* * * * *